United States Patent
Aepli

(10) Patent No.: US 12,104,055 B2
(45) Date of Patent: Oct. 1, 2024

(54) TRANSPARENT POLYAMIDES WITH GOOD WEATHERING RESISTANCE

(71) Applicant: EMS-CHEMIE AG, Domat/Ems (CH)

(72) Inventor: Etienne Aepli, Domat/Ems (CH)

(73) Assignee: EMS-CHEMIE AG, Domat/Ems (CH)

( * ) Notice: Subject to any disclaimer, the term of this patent is extended or adjusted under 35 U.S.C. 154(b) by 15 days.

(21) Appl. No.: 17/863,240

(22) Filed: Jul. 12, 2022

(65) Prior Publication Data

US 2023/0033437 A1 Feb. 2, 2023

(51) Int. Cl.
| | |
|---|---|
| *C08L 77/06* | (2006.01) |
| *B29C 39/00* | (2006.01) |
| *B29K 77/00* | (2006.01) |
| *B29K 507/04* | (2006.01) |

(52) U.S. Cl.
CPC ............ *C08L 77/06* (2013.01); *B29C 39/003* (2013.01); *B29K 2077/00* (2013.01); *B29K 2507/04* (2013.01); *B29K 2995/002* (2013.01); *B29K 2995/0026* (2013.01); *B29K 2995/0039* (2013.01)

(58) Field of Classification Search
CPC .......... B29K 2077/00; B29K 2995/002; B29K 2995/0026; B29K 2995/0039; C08K 5/005; C08K 5/0041; C08L 77/02–06; C08L 2666/28; C08L 2666/70; C08L 2666/78; C08L 2666/80; C08L 2666/82
See application file for complete search history.

(56) References Cited

U.S. PATENT DOCUMENTS

2017/0368762 A1* 12/2017 Gautam ............. B29C 65/1635

FOREIGN PATENT DOCUMENTS

| CN | 109401298 A | 3/2019 |
|---|---|---|
| JP | 2008266434 A | 11/2008 |

OTHER PUBLICATIONS

Priority Search Report issued for Application No. CH700512021 with a Mailing Date of Jan. 17, 2022.

* cited by examiner

*Primary Examiner* — Ana L. Woodward
(74) *Attorney, Agent, or Firm* — Dennemeyer & Associates LLC

(57) ABSTRACT

The invention relates to a polyamide molding composition with good weathering resistance containing or preferably consisting of the following components:

85 to 99.85% by weight of a component A, where component A consists of polyamide A1 or of a mixture of the polyamides A1 and A2, where A1 is at least one amorphous or microcrystalline polyamide having more than 60 mol % of monomers having exclusively aliphatic structural units, based on the total amount of monomers, and A2 is at least one acyclic aliphatic polyamide, and where the sum of components A1 and A2 gives 100% by weight of component A;

0.05 to 2.0% by weight of at least one colorant B;

0.10 to 3.0% by weight of at least one stabilizer C;

0 to 10% by weight of additives D, other than A, B and C;

the proportions by weight of components A to D summing to 100% by weight, wherein the polyamide molding composition comprises neither carbon black nor nigrosine, the color lightness L*, determined according to DIN EN ISO 11664-4:2020 in the CIELAB color space on a plate of the dimension 60×60×2 mm, being at most 32, and the polyamides A1 having a transparency of at least 88% and a haze of at most 5%, in each case determined according to ASTM-D1003-21 on a plate of the dimension 60×60×2 mm.

19 Claims, No Drawings

TRANSPARENT POLYAMIDES WITH GOOD WEATHERING RESISTANCE

CROSS-REFERENCE TO RELATED APPLICATIONS

This application claims priority to Switzerland application 070051/2021, filed Jul. 14, 2021, which is hereby incorporated by reference in its entirety.

The present invention relates to black-colored polyamide molding compounds based on transparent polyamides with good weathering resistance, moldings produced therefrom and their use.

Because of their very good optical and mechanical properties, the use of amorphous or microcrystalline polyamide molding compounds is widespread for applications in the field of automotive parts, electronics, optical components, screens, housings, visible surfaces, etc.

Black colored moldings are used in many applications in the technical sector, which have the advantage of a so-called piano lacquer look in the visible area, i.e. they give the impression of a blackness extending into the depth coupled with a high gloss. In the prior art, the colorant used for blackening is mainly carbon black, in particular fine-grained, so-called UV carbon black.

PRIOR ART

For example, U.S. Pat. No. 5,945,469 describes a polyamide composition which, in addition to polyamides and reactive polysiloxanes, comprise hindered amines and phosphites or phosphonites. The black coloration of the molding compound is achieved by means of finely divided carbon black, which has an absorption coefficient greater than 400. Such molding compounds are said to exhibit reduced color change after weathering.

U.S. Pat. No. 6,265,472 B1 relates to filler-containing polyamide molding compounds with improved weathering resistance, which are colored black by means of carbon black and copper phthalocyanine dyes.

JP 2008 266 434 A relates to black colored polyamide molding compounds and articles formed therefrom that can be joined to suitable substrates by laser welding. Laser welding becomes possible when the colorant carbon black is replaced by, for example, a mixture of antraquinone and perylene dyes. However, the weathering resistance of these laser-weldable molding compounds cannot quite compete with the molding compounds of the prior art, which are otherwise identical but contain carbon black as a colorant.

WO 2017/144276 A1 also concerns the laser welding of purely black colored polyamide compositions. However, no information is provided on weathering resistance.

WO 2012/080398 A2 concerns transparent polymer compositions based on polycarbonate colored with organic dyes. The aim is to provide a polycarbonate molding compound that is colored as neutrally as possible in gray and has good heat and weather resistance. This is achieved by a special selection and combination of organic colorants, but carbon black is always used in the color mixture.

Thus, in the prior art, no molding compound has been described that is based on transparent polyamide, that is colored black without the use of carbon black, and that has better weathering resistance than those compounds that are colored with carbon black.

The present invention provides a polyamide molding compound based on transparent polyamides which is characterized by a piano black appearance. The polyamide molding compound should have a color lightness $L^*$, determined according to DIN EN ISO 11664-4:2020 in the CIELAB color space on a sheet of 60×60×2 mm, of at most 32, a high gloss and good weathering resistance. In particular, the gloss should decrease only slightly under weathering at an angle of 60° and the color lightness difference $\Delta L^*$ and the color distance $\Delta E$, determined in comparison with the unweathered specimen according to DIN EN ISO 11664-4:2020 in the CIELAB color space on a plate of the dimension 60×60×2 mm, should be only slight. In this respect, the weathering resistance is to be significantly improved compared to polyamide molding compounds in which the colorant carbon black is used alone or in combination with other colorants.

Specifically, it is preferred if the polyamide molding compounds according to the invention have a color lightness difference $\Delta L^*$ of at most 3, a color difference $\Delta E$ of at most 4 and a change in gloss at 60° of less than 20% after 1000 hours of weathering according to DIN EN ISO 4892-2:2013, with the non-weathered sample serving as the reference for the change in gloss, $\Delta L^*$ or $\Delta E$.

This problem is solved by the polyamide molding composition according to claim 1, which contains the following components or preferably consists of the following components: 85 to 99.85% by weight of a component A, where component A consists of polyamide A1 or of a mixture of the polyamides A1 and A2, where:

A1 is at least one amorphous or microcrystalline polyamide containing more than 60 mol % of monomers having exclusively aliphatic structural units, based on the total amount of monomers; and A2 is at least one acyclic aliphatic polyamide; and the sum of components A1 and A2 being 100% by weight of component A;

0.05 to 2.0% by weight of at least one colorant B;

0.10 to 3.0% by weight of at least one stabilizer C 0 to 10% by weight of additives D, other than A, B and C;

the proportions by weight of components A to D adding to 100% by weight; the polyamide molding composition comprising neither carbon black nor nigrosine;

wherein the color lightness $L^*$, determined according to DIN EN ISO 11664-4:2020 in CIELAB-color space on a plate of dimension 60×60×2 mm, is at most 32; and wherein the polyamides A1 have a transparency of at least 88%, preferably of at least 90%, and a haze of at most 5%, preferably of at most 3%, each determined according to ASTM-D1003-21 on a plate of dimension 60×60×2 mm.

Advantageous embodiments of the polyamide molding composition according to the present invention are given in dependent claims 2 to 13. Furthermore, the present invention according to claim 14 relates to moldings which comprise the polyamide molding composition according to the invention and preferably consist thereof. Furthermore, the invention relates to the use of the colorants according to the invention in black-colored polyamide molding compositions based on transparent polyamides for improving weathering resistance according to claim 15.

DEFINITIONS OF TERMS

Notation and Abbreviations for Polyamides and their Monomers

For the purposes of the present invention, the term "polyamide" (abbreviation PA) is understood to be a generic term, this includes homopolyamides and copolyamides. The chosen spellings and abbreviations for polyamides and their monomers correspond to those specified in DIN EN ISO standard 16396-1:2015. The abbreviations used therein are used in the following as synonyms to the IUPAC names of the monomers; in particular, the following abbreviations for monomers occur: MACM for bis(4-amino-3-methyl-cyclohexyl)methane (also referred to as 3,3'-dimethyl-4,4'-diaminodicyclohexylmethane, CAS no. 6864-37-5), PACM for bis(4-aminocyclohexyl)methane (also referred to as 4,4'-diaminodicyclohexylmethane, CAS no. 1761-71-3), TMDC for bis(4-amino-3,5-dimethylcyclohexyl)methane (also referred to as 3,3',5,5'-tetramethyl-4,4'-diaminodicyclohexylmethane, CAS no. 65962-45-0), T for terephthalic acid (CAS No. 100-21-0), I for isophthalic acid (CAS No. 121-95-5), BAC for 1,4-bis(aminomethyl)cyclohexane (CAS No. 2549-93-1).

Quantities

The polyamide molding compositions according to the present invention comprise components A to D or, preferably, consist exclusively of components A to D. The requirement is that components A to D add up to 100% by weight. The specified ranges of amounts for the individual components A to D are to be understood as meaning that an arbitrary amount for each of the individual components can be selected within the specified ranges, provided that the strict requirement is met that the sum of all components A to D adds up to 100% by weight.

Amorphous or Microcrystalline Polyamides

Amorphous or microcrystalline polyamides preferably exhibit a heat of fusion of not more than 25 J/g, particularly preferably of not more than 22 J/g, most preferably 0 to 20 J/g, in dynamic differential scanning calorimetry (DSC) according to DIN EN ISO 11357-3 (2018) at a heating rate of 20 K/min.

In addition to a glass transition temperature, microcrystalline polyamides also have a melting point. However, they have a morphology in which the crystallites have such a small dimension that a sheet made from them with a thickness of 2 mm is still transparent, i.e. its light transmission is at least 90% and its haze at most 3%, measured according to ASTM D 1003-21 (2021).

Compared to microcrystalline polyamides, amorphous polyamides have no or only a very low, hardly detectable heat of fusion. In dynamic differential calorimetry according to DIN EN ISO 11357-3 (2018) at a heating rate of 20 K/min, the amorphous polyamides preferably exhibit a heat of fusion of at most 5 J/g, particularly preferably at most 3 J/g, most preferably from 0 to 1 J/g. Amorphous polyamides do not have a melting point due to their amorphousness.

For the purposes of the invention, semi-crystalline polyamides are those polyamides which, in dynamic differential calorimetry according to DIN EN ISO 11357-3 (2018) at a heating rate of 20 K/min, preferably have a heat of fusion of more than 25 J/g, particularly preferably of at least 30 J/g, most preferably of at least 35 J/g. A sheet made of semi-crystalline polyamides with a thickness of 2 mm is not transparent, i.e. its light transmission is below 90% and/or its haze is above 3%, in each case measured according to ASTM D 1003-21 (2021).

Transparent Polyamides

For the purposes of the present invention, a transparent polyamide is present if its light transmission, measured according to ASTM D 1003-21 (2021) on sheets with a thickness of 2 mm, is at least 88%, preferably at least 90%, and its haze is at most 5%, preferably at most 3%. When transparent polyamides are referred to in the following disclosure, amorphous or microcrystalline polyamides that meet the above definitions regarding transparency and heat of fusion are always meant.

Components A, A1 and A2

The polyamide molding composition according to the invention contains from 85 to 99.85% by weight of a component A, where component A consists of polyamide A1 or of a mixture of the polyamides A1 and A2, based on the sum of components A to D. The proportions by weight of components A1 and A2 add up to 100% by weight of component A, and the content of polyamide A1 in component A is preferably at least 50% by weight. Component A1 is at least one transparent polyamide containing at least 60 mol % of monomers having exclusively aliphatic structural units, based on the total amount of monomers in polyamide A1. A1 is amorphous or microcrystalline. The component A preferably consists of 50 to 95% by weight of polyamide A1 and 5 to 50% by weight of polyamide A2, particularly preferably from 60 to 85 wt. % polyamide A1 and 15 to 40 wt. % polyamide A2 and, in particular, preferably from 65 to 80% by weight of polyamide A1 and 20 to 35% by weight of polyamide A2.

A2 is at least one acyclic aliphatic polyamide. The polyamides A2 are preferably selected from the group consisting of PA 11, PA 12, PA 1010, PA 1016, PA 610, PA 612, PA 614, PA 616, PA 66, PA 6, PA 6/12 and mixtures thereof.

The at least 60 mol % of monomers with exclusively aliphatic structural units may be aliphatic diamines, aliphatic dicarboxylic acids, aliphatic lactams or aliphatic aminocarboxylic acids. Polyamide A1 thus consists of at least 60 mol % of monomers with exclusively aliphatic structural units and a maximum of 40 mol % of monomers containing aromatic structural units.

Furthermore, the requirement applies, that the transparent polyamides A1 have a transparency of at least 88%, preferably of at least 90%, and a haze of at most 5%, preferably of at most 3%.

According to a preferred embodiment of the present invention, component A1 is amorphous.

According to a preferred embodiment of the present invention, the proportion of component A is in the range from 91 to 99.72% by weight, particularly preferably 94.7 to 99.55% by weight, in each case based on the sum of components A to D.

According to a further preferred embodiment of the present invention, the transparent polyamides A1 are composed of the following monomers:
  a-A1 15 to 100 mol % of cycloaliphatic diamines, based on the total amount of diamines;
  b-A1 0 to 85 mol % of open-chain aliphatic diamines, based on the total amount of diamines;
  c-A1 20 to 100 mol % of aliphatic dicarboxylic acids, based on the total amount of dicarboxylic acids;
  d-A1 0 to 80 mol % of aromatic dicarboxylic acids, based on the total amount of dicarboxylic acids;
  e-A1 0 to 40 mol % of aliphatic lactams and/or aliphatic aminocarboxylic acids having from 6 to 12 carbon atoms, based on the total amount of the monomers a-A1 to e-A1;
  where the sum of the diamines a-A1 and b-A1 is 100 mol %;
  and the sum of the dicarboxylic acids c-A1 and d-A1 is 100 mol %.

According to another preferred embodiment of the present invention, the transparent polyamide A1 contains at least 63 mol %, preferably at least 68 mol %, in particular at least 70 mol %, particularly preferably in the range from 60 to 100 mol % or 63 to 100 mol % or 68 to 100 mol % of monomers having exclusively aliphatic structural units, based on the total amount of monomers. The total amount of monomers is the sum of components a-A1 to e-A1, and the content of monomers containing exclusively aliphatic structural units is the sum of components a-A1, b-A1, c-A1 and e-A1.

Another preferred embodiment of the present invention provides that the at least one polyamide A2 is selected from the group consisting of PA 11, PA 12, PA 1010, PA 1016, PA 610, PA 612, PA 614, PA 616, PA 66, PA 6, PA 6/12, and mixtures thereof.

In another preferred embodiment of the present invention, the cycloaliphatic diamine a-A1 is selected from the group consisting of bis-(4-amino-3-methylcyclohexyl)methane (MACM), Bis-(4-aminocyclohexyl)methane (PACM), Bis-(4-amino-3-ethylcyclohexyl)methane, Bis-(4-amino-3,5-dimethylcyclohexyl)methane, 2,6-norbornanediamine (2,6-bis-(aminomethyl)norbornane), 1,3-diaminocyclohexane, 1,4-diaminocyclohexanediamine, isophorone diamine, 1,3-bis(aminomethyl)cyclohexane, 1,4-bis(aminomethyl)cyclohexane (BAC), 2,2-(4,4'-diaminodicyclohexyl)propane, and mixtures thereof. Particularly preferred cycloaliphatic diamines a-A1 are selected from the group consisting of bis-(4-amino-3-methylcyclohexyl)methane (MACM) and bis(4-amino-cyclohexyl)methane (PACM) and mixtures thereof.

According to another preferred embodiment, the diamine b-A1 is selected from the group consisting of 1,4-butanediamine, 1,5-pentanediamine, 2-methyl-1,5-pentanediamine, hexanediamine, in particular 1,6-hexanediamine, 2,2,4-trimethyl-1,6-hexamethylenediamine, 2,4,4-trimethyl-1,6-hexamethylenediamine, nonandiamine, in particular 1,9-nonandiamine, 2-methyl-1,8-octanediamine, 1,10-decanediamine, 1,11-undecanediamine, 1,12-dodecanediamine, 1,13-tridecanediamine, 1,14-tetradecanediamine, 1,18-octadecanediamine, and mixtures thereof. Particularly preferred are the open-chain aliphatic diamines b-A1 selected from the group consisting of diamines having 6 to 10 carbon atoms, in particular 1,6-hexanediamine, 1,9-nonanediamine, 1,10-decanediamine, and mixtures thereof.

Another preferred embodiment of the present invention provides that the aliphatic dicarboxylic acid c-A1 is selected from the group consisting of 1,6-hexanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,16-hexadecanedioic acid, 1,18-octadecanedioic acid, 1,3-cyclopentanedicarboxylic acid, 1,3-cyclohexanedicarboxylic acid, 1,4-cyclohexanedicarboxylic acid, 2,3-norbornanedicarboxylic acid, 2,6-norbornanedicarboxylic acid, and mixtures thereof. Particularly preferred are the aliphatic dicarboxylic acids c-A1 selected from the group consisting of dicarboxylic acids having 6 to 12 carbon atoms, in particular 1,6-hexanedioic acid, 1,10-decanedioic acid, 1,12-dodecanedioic acid, and mixtures thereof.

According to a further preferred embodiment of the present invention, the aromatic dicarboxylic acid d-A1 is selected from the group consisting of terephthalic acid, isophthalic acid, naphthalenedicarboxylic acids (NDA), in particular 1,5-naphthalenedicarboxylic acid and 2,6-naphthalenedicarboxylic acid, biphenyldicarboxylic acids, in particular biphenyl-2,2'-dicarboxylic acid, 4,4'-diphenyldicarboxylic acid, 3,3'-diphenyldicarboxylic acid, 4,4'-diphenyletherdicarboxylic acid, 4,4'-diphenylmethanedicarboxylic acid and 4,4'-diphenylsulfone dicarboxylic acid, 1,5-anthracenedicarboxylic acid, p-terphenylene-4,4"-dicarboxylic acid and 2,5-pyridinedicarboxylic acid and mixtures thereof. Particularly preferred aromatic dicarboxylic acids d-A1 are selected from the group consisting of terephthalic acid, isophthalic acid and mixtures thereof.

According to another preferred embodiment of the present invention, the lactam and/or the α,ω-aminocarboxylic acids are e-A1 selected from the group consisting of caprolactam (CL), α,ω-aminocaproic acid, α,ω-aminoheptanoic acid, α,ω-aminoctanoic acid, α,ω-aminononanoic acid, α,ω-aminodecanoic acid, α,ω-aminoundecanoic acid (AUA), laurolactam (LL) and α,ω-aminododecanoic acid (ADA), particularly preferred are. caprolactam, α,ω-aminocaproic acid, laurolactam, α,ω-aminoundecanoic acid and α,ω-aminododecanoic acid, and mixtures thereof.

In another preferred embodiment of the present invention, the cycloaliphatic diamine a-A1 is selected from the group consisting of bis-(4-amino-3-methylcyclohexyl)methane, bis-(4-aminocyclohexyl)methane, bis-(4-amino-3, 5-dimethyl cyclohexyl)methane, 1,3-bis(aminomethyl)cyclohexane, 1,4-bis(aminomethyl)cyclohexane and mixtures thereof and/or the diamine b-A1 is selected from the group consisting of 1,6-hexanediamine, 1,9-nonanediamine, 1,10-decanediamine, 1,11-undecanediamine, 1,12-dodecanediamine, and mixtures thereof and/or the aliphatic dicarboxylic acid c-A1 is selected from the group consisting of 1,6-hexanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,16-hexadecanedioic acid, 1, 18-octadecanedioic acid, and mixtures thereof and/or the aromatic dicarboxylic acid d-A1 is selected from the group consisting of terephthalic acid, isophthalic acid, 1,5-naphthalenedicarboxylic acid and 2,6-naphthalenedicarboxylic acid, and mixtures thereof and/or the lactam and/or the α,ω-aminocarboxylic acids e-A1 are selected from the group consisting of caprolactam (CL), α,ω-aminocaproic acid, α,ω-aminoundecanoic acid (AUA), lauric lactam (LL) and α,ω-aminododecanoic acid (ADA) and mixtures thereof. Particularly preferably, all of the above-mentioned selection lists for components a-A1 to e-A1 are selected simultaneously.

Particularly preferred diamines a-A1 are selected from the group consisting of bis-(4-amino-3-methylcyclohexyl)methane (MACM) and bis(4-aminocyclohexyl)methane (PACM) and mixtures thereof, and the open-chain, aliphatic diamines b-A1 are selected from the group consisting of 1,6-hexanediamine, 1,9-nonanediamine, 1,10-decanediamine and mixtures thereof and the aliphatic dicarboxylic acids c-A1 are selected from the group consisting of 1, 6-hexanedioic acid, 1,10-decanedioic acid, 1,12-dodecanedioic acid and mixtures thereof and the aromatic dicarboxylic acids d-A1 are selected from the group consisting of terephthalic acid, isophthalic acid and mixtures thereof and the lactams and/or aminocarboxylic acids e-A1 are selected from the group consisting of caprolactam, aminocaproic acid, aminoundecanoic acid, lauric lactam and aminododecanoic acid and mixtures thereof.

According to another preferred embodiment of the present invention, the polyamide A1 is selected from the group consisting of PA MACM9, PA MACM10, PA MACM11, PA MACM12, PA MACM13, PA MACM14, PA MACM15, PA MACM16, PA MACM17, PA MACM18, PA MACM36, PA PACM9, PA PACM10, PA PACM11, PA PACM12, PA PACM13, PA PACM14, PACM15, PA PACM16, PACM17, PA PACM18, PA PACM36, PA TMDC9, PA TMDC10, PA TMDC11, PA TMDC12, PA TMDC13, PA TMDC14, PA TMDC15, PA TMDC16, PA TMDC17, PA TMDC18, PA TMDC36, PA MACM10/1010, PA MACM10/PACM10, PA MACM12/1012, PA MACM14/1014, PA PACM10/1010, PAPACM12/1012, PA PACM14/1014, PA MACM12/PACM12, PA MACM14/PACM14, PA MACMI/12, PA MACMI/1012, PA MACMT/12, PA MACMI/MACMT/12, PA MACMI/MACMT/MACM12, PA 6I/6T/MACMI/MACMT/12, PA 6I/612/MACMI/MACM12, PA 6T/612/MACMT/MACM12, PA 6I/6T/612/MACMI/MACMT/MACM12, PA 6I/6T/MACMI/MACMT/PACMI/PACMT/12, PA MACMI/MACMT/MACM36, PA MACMI/MACM36, PA MACMT/MACM36, PA PACMI/12, PA PACMT/12, PA PACMT/6, PA PACMI/6, and mixtures thereof.

Particularly preferably, component A consists of the following combinations of polyamides A1 and A2:

Polyamide A1 is PA 6I/6T/612/MACMI/MACMT/MACM12 and polyamide A2 is PA 12, or

Polyamide A1 is PA MACMI/12 and polyamide A2 is PA 12, or

Polyamide A1 is PA MACM12 and polyamide A2 is PA 12.

Preferably, component A consists of polyamides A1 and A2 as follows:

50 to 95 wt. % polyamide A1 and 5 to 50 wt. % polyamide A2; or 60 to 85 wt. % polyamide A1 and 15 to 40 wt. % polyamide A2; or 65 to 80% by weight of polyamide A1 and 20 to 35% by weight of polyamide A2. In this case, the sum of components A1 and A2 is 100% by weight of component A.

According to a further preferred embodiment of the present invention, component A1 has a glass transition temperature determined according to DIN EN ISO 11357-2:2020 of at least 135° C., preferably at least 140° C., particularly preferably 145° C. and especially preferably 150° C.

According to a further preferred embodiment of the present invention, the polyamides A1 are free of monomers having aromatic structural units.

Preferably, component A1 has a relative viscosity, measured according to ISO 307:2007 in a solution of 0.5 g of polymer in 100 ml of m-cresol at 20° C., in the range from 1.35 to 2.40, particularly preferably from 1.40 to 1.90 and especially preferably from 1.45 to 1.80.

Preferably, component A2 has a relative viscosity, measured according to ISO 307:2007 in a solution of 0.5 g polymer in 100 ml m-cresol at 20° C., in the range from 1.70 to 3.00, particularly preferably from 1.75 to 2.70 and more preferably from 1.80 to 2.40.

Component B

Component B is a colorant or mixture of colorants suitable for coloring the polyamide molding compound black. For the purposes of the present invention, colored black means that the color lightness L* of the polyamide molding compound, determined according to DIN EN ISO 11664-4:2020, is at most 32. Colorants can be organic or inorganic, dyes or pigments. Dyes are colorants that normally do not scatter light, but absorb light at a certain visible wavelength. Dyes are often soluble in the polymer matrix in a certain concentration.

Pigments are organic or inorganic dyes that are usually present as discrete particles that are insoluble in the polymer matrix. The designation of a particular dye as a pigment or dye depends on the polymer matrix, dye concentration and crystallinity, temperature, and other factors. With respect to the present invention, preferred colorants are soluble in the polyamide molding composition in concentrations necessary to color the moldings. The polyamide molding compositions according to the invention are free of carbon black and/or nigrosine, i.e. contain neither carbon black nor nigrosine.

According to the invention, colorants are used in amounts and in combinations sufficient to color the molding compounds black and substantially opaque, and in particular to achieve the lightness values (color lightness) and/or transmission values in the visible and near infrared range described below. The specific amount of a colorant used depends, among other things, on its solubility and extinction coefficient in the thermoplastic matrix and on whether it is used in combination with one or more additional colorants.

The proportion of component B is in the range of 0.05 to 2.0% by weight, based on the sum of components A to D. According to a preferred embodiment of the present invention, the proportion of component B is in the range from 0.08 to 1.5% by weight, and particularly preferably 0.10 to 1.0% by weight, based in each case on the sum of components A to D.

Suitable colorants generally exhibit high extinction coefficients in the visible wavelength range, low extinction coefficients in the near infrared range (NIR) and high thermal stability. A high thermal stability of the colorants is present if no significant color shift or thermal degradation is observed during production and processing of the colored molding compounds by injection molding or extrusion in the temperature range between 230 and 300° C. In addition, the colorants should not attack or degrade the polymer, which can lead to unacceptable loss of mechanical properties or formation of gaseous by-products during molding.

Synthetic colorants are typically derived from coal tar or petroleum intermediates. Colorants of many different types are available for use in thermoplastics. The Color Index lists many different chemical classes of colorants, including, for example. Nitroso, nitro, mono-azo, diazo, triazo, polyazo, azo, stilbene, carotenoid, diphenylmethane, triarylmethane, xanthene, quinoline, acridine, methine, thiazole, indamine, indophenol, azine, oxazine, thiazine, sulfur, lactone, aminoketone, hydroxyketone, anthraquinone, indigloid and phthalocyanine, as well as inorganic pigments.

Preferred colorants or colorant combination are selected from the group consisting of pyrazolone, perinone and anthraquinone, methine, azo and coumarin dyes and/or metal-containing pigments, such as inorganic pigments and the metal complexes of azo, azomethine or methine dyes, azomethine, quinacridone, dioxazine, isoindoline, isoindolinone, perylene, phthalocyanine, pyrrolopyrrole and thioindigo colorants.

Examples of inorganic pigments are antimony trioxide, antimony pentoxide, basic lead carbonate, basic lead sulfate or lead silicate, lithophones, titanium dioxide (anatase, rutile), zinc oxide, zinc sulfide, metal oxides such as Berlin/Prussian blue, lead chromate, lead sulfochromates, chromium antimontitanate, chromium oxides, iron oxides, cobalt blue, cobalt chrome blue, cobalt nickel gray, manganese blue, manganese violet, molybdate orange, molybdate red, nickel antimontitanate, ultramarine blue, and metal sulfides such as antimony trisulfide, cadmium sulfide, cadmium sulfoselenides, zirconium silicates, zirconium vanadium blue, zirconium praseodymium yellow. Suitable polymer-soluble dyes are, for example, disperse dyes such as those of the anthraquinone series, for example alkylamino-, amino-, arylamino-, cyclohexylamino-, hydroxy-, hydroxyamino- or phenyl-mercaptoanthraquinones, and metal complexes of azo dyes, in particular 1:2-chromium or cobalt complexes of monoazo dyes, as well as fluorescent dyes, for example those from the benzothiazole, coumarin, oxarin or thiazine series.

Preferably, the at least one colorant B comprises at least one colorant mentioned below and, particularly preferably, the at least one colorant B is selected from the group of colorants mentioned below, indicated below as Color Index Generic Names (CIGN): Solvent Green 3, Solvent Green 28, Solvent Red 52, Solvent Red 111, Solvent Red 135, Solvent Red 169, Solvent Red 179, Solvent Red 207, Disperse Red 22, Vat Red 41, Solvent Orange 60, Solvent Orange 63, Solvent Violet 13, Solvent Violet 14, Solvent Violet 50, Disperse Blue 73, Solvent Blue 97, Solvent Blue 101, Solvent Blue 104, Solvent Blue 138, Disperse Yellow 160, Solvent Yellow 84, Solvent Yellow 93, Solvent Yellow 98, Solvent Yellow 163, Solvent Yellow 160:1, and mixtures thereof. These colorants exhibit good thermal stability.

Preferred colorants with a phthalocyanine structure are, for example, Pigment Blue 15:1, Pigment 15:3, Pigment Blue 16 and Pigment Green 7.

Preferred as component B are furthermore Solvent Brown 53, Pigment Brown 23, Pigment Brown 24, Pigment Brown 25, Pigment Orange 68, Solvent Orange 60, Solvent Orange 63 and Pigment Brown 6.

Particularly preferred dyes are Solvent Red 135, Solvent Red 179, Solvent Violet 13, Solvent Violet 14, Solvent Violet 36, Solvent Violet 50, Disperse Blue 73, Solvent Yellow 93, Solvent Green 3, Disperse Yellow 160, Solvent Blue 97, and mixtures containing at least one of the above-mentioned dyes.

Preferably, the polyamide molding compounds of the invention are provided with colorants (component B) in such a way that the color lightness L* measured in the CIE-LAB light space is equal to or less than 30, particularly preferably equal to or less than 27.

In a further preferred embodiment, the colorants are selected and their content adjusted in such a way that the transmission of the sheets of the dimension 60×60×2 mm produced from the polyamide molding compounds according to the invention in the wavelength range from 400 to 650 nm is at most 10%, preferably at most 5% and particularly preferably at most 3%. The measurements were carried out with a Cary 5000 UV/VIS/NIR spectrometer from Agilent Technologies with integration sphere according to DIN EN ISO 13468-2:2006.

Furthermore, it is preferred if the sheets of dimension 60×60×2 mm produced from the polyamide molding compounds according to the invention have a transmission in the wavelength range from 750 to 1200 nm of at least 50%, particularly preferably of at least 60% and especially preferably of at least 70%. The measurements were carried out with a Cary 5000 UV/VIS/NIR spectrometer from Agilent Technologies with integration sphere according to DIN EN ISO 13468-2:2006.

Particularly preferably, the colorants are selected from the group of the following colorant mixtures:
Solvent Green 3 and Solvent Red 179
Solvent Red 52 and Solvent Blue 97
Solvent Green 3, Solvent Blue 97 and Solvent Red 179.
A very particularly preferred colorant is a mixture B of the following components:
B1 20-40 wt. % Solvent Green 3
B2 10-30 wt. % Solvent Blue 97
B3 40-70 wt. % Solvent Red 179
the sum of components B1 to B3 being 100% by weight of mixture B (component B). Preferably, the content of this colorant mixture B is 0.15 to 0.25% by weight based on the sum of components A to D.
Component C The molding composition according to the invention comprises as component C at least one stabilizer selected from the group consisting of inorganic and organic stabilizers, in particular antioxidants, antiozonants, heat stabilizers, light stabilizers, UV stabilizers, UV absorbers or UV blockers. Preferably, the stabilizer C is a UV stabilizer and/or a heat stabilizer.

The content of stabilizer C is 0.10 to 3.0% by weight, preferably 0.20 to 2.5% by weight and particularly preferably 0.25 to 2.3% by weight, in each case based on the sum of A to D.

According to a preferred embodiment, component C may be selected from the following group:
Compounds of monovalent or divalent copper, in particular salts of monovalent or divalent copper with inorganic or organic acids or monovalent or divalent phenols, the oxides of monovalent or divalent copper, or the complex compounds of copper salts with ammonia, amines, amides, lactams, cyanides or phosphines, preferably Cu(I) or Cu(II) salts of hydrohalic acids, of the hydrocyanic acids or the copper salts of the aliphatic carboxylic acids, the monovalent copper compounds CuCl, CuBr, CuI, CuCN and $Cu_2O$, and the divalent copper compounds $CuCl_2$, $CuSO_4$, CuO, copper(II) acetate or copper (II) stearate being particularly preferred, or mixtures of these compounds, these copper compounds being used as such or preferably in the form of concentrates. In this context, concentrate means a polymer, preferably of the same or essentially the same chemical nature as component A1 or A2, which contains the copper salt or the copper compound in high concentration. In particular, the copper compounds are preferably used in combination with other metal halides, including alkali halides, such as NaI, KI, NaBr, KBr, the molar ratio of metal halide to copper being 0.5 to 20, preferably 1 to 10 and particularly preferably 2 to 7;
stabilizers based on secondary aromatic amines;
stabilizers based on sterically hindered phenols;
phosphites and phosphonites,
stabilizers selected from the group consisting of N,N'-oxamides, hydroxyphenyltriazines, hydroxyphenylbenzotriazoles, dibenzoylmethanes, aminohydroxybenzoylbenzoic acid esters, hydroxybenzophenones, hindered amine light stabilizers (HALS), as well as mixtures of the above stabilizers.

Particularly preferred examples of stabilizers based on secondary aromatic amines which can be used according to the invention are adducts of phenylenediamine with acetone (Naugard A), adducts of phenylenediamine with linols, Naugard 445, N,N'-dinaphthyl-p-phenylenediamine, N-phenyl-N'-cyclohexyl-p-phenylenediamine or mixtures of two or more thereof. Preferred examples of stabilizers based on sterically hindered phenols that can be used according to the invention are N,N'-hexamethylene-bis-3-(3,5-di-tert-butyl-4-hydroxyphenyl)-propionamide, bis-(3,3-bis-(4'-hydroxy-3'-tert-butylphenyl)-butanoic acid) glycol ester, 2,1'-thioethylbis-(3-(3,5-di. tert-butyl-4-hydroxyphenyl)-propionate, 4-4-butylidene-bis-(3-methyl-6-tert. butylphenol), triethylene glycol 3-(3-tert-butyl-4-hydroxy-5-methylphenyl)-propionate or mixtures of two or more of these stabilizers.

Preferred phosphites and phosphonites are triphenylphosphite, diphenylalkylphosphite, phe-nyldialkylphosphite, tris (nonylphenyl)phosphite, trilaurylphosphite, trioctadecylphosphite, distea-rylphentaerythritol diphosphite, tris (2, 4-di-tert-butylphenyl)phosphite, diisodecylpentaerythritol diphosphite, bis(2,4-di-tertbutylphenyl)pentaerythritol diphosphite, bis(2,6-di-tert-butyl-4-methylphenyl)pentaerythritol diphosphite, diisodecyloxypentaerythritol diphosphite, bis(2, 4-di-tert-butyl-6-methylphenyl)pentaerythritol diphosphite, bis(2,4,6-tris-(tert-butylphenyl))pentaerythritol diphosphite, tristearyl sorbitol triphosphite, tetrakis(2,4-di-tert-butylphenyl)-4,4'-biphenylenediphosphonite, 6-isooctyloxy-2,4,8, 10-tetra-tert-butyl-12H-dibenz-[d,g]-1,3,2-dioxaphosphocine, 6-fluoro-2,4,8,10-tetra-tert-butyl-12-methyl-dibenz[d,g]-1, 3,2-dioxaphosphocine, bis(2,4-di-tert-butyl-6-methylphenyl)methylphosphite and bis(2,4-di-tert-butyl-6-methylphenyl)ethylphosphite. In particular, tris[2-tert-butyl-4-thio(2'-methyl-4'-hydroxy-5'-tert-butyl)-phenyl-5-methyl]phenyl phosphite and tris(2,4-di-tert-butylphenyl)phosphite (Hostanox@ PAR24: commercial product of Clariant, Basel) are preferred.

A preferred embodiment of the heat stabilizer is the combination of Irgatec NC 66 (available from BASF) and a copper stabilization based on CuI and KI. In particular, a heat stabilization based exclusively on CuI and KI is preferred.

According to a further preferred embodiment, the heat stabilizers of component C are selected from the group of phenol-based heat stabilizers, phosphite-based heat stabilizers, amine-based heat stabilizers, or mixtures or combinations thereof, with particular preference being given to component C selected from the following group: triethylene glycol bis(3-tert-butyl-4-hydroxy-5-methylphenyl)propionate, pentaerythritol tetrakis(3-(3,5-di-tert-butyl-4-hydroxyphenyl)propionate), N, N'-hexamethylene bis[3-(3,5-di-t-butyl-4-hydroxyphenyl)propionamide], tris(2,4-di-tert-butylphenyl) phosphite, tris(2,4-di-tert-butylphenyl) phosphite, or mixtures thereof.

Preferred organic stabilizers are phenolic and/or phosphite compounds, such as Irganox 245, Irganox 1010, Irganox 1098, Hostanox PAR 24 or Irgafos 168. Particularly preferred as component (D) is a mixture of 10 parts by wt. parts of a mixture of Irganox 1010 (CAS 6683-19-8, phenolic antioxidant) and Anox 20 (CAS 6683-19-8, phenolic antioxidant) in a ratio of 7:3 and 2 parts by weight of Hostanox PAR24 (CAS: 31570-04-4, tris(2,4-ditert-butylphenyl)phosphite).

Preferred UV stabilizers are, for example, selected from the group consisting of N-(2-ethoxyphenyl)-N'-(2-ethylphenyl)oxamide (Tinuvin 312), 2-(4,6-diphenyl-1,3,5-triazin-2yl)-5-hexyloxyphenol (Tinuvin 1577), 2-(4,6-diaryl-1,3,5-triazin-2yl)-5-(alkoxy substituted)-phenol (Tinuvin 1600), 2-tert-butyl-6-(5-chlorobenzotriazol-2-yl)-4-methylphenol (Tinuvin 326), 2-(benzo-triazol-2-yl)-4,6-bis(2-phenylpropan-2-yl)phenol (Tinuvin234), bis(2,2,6,-tetramethyl-4-piperidyl)sebacate (Tinuvin 770 DF), 2-(2-hydroxyphenyl)-benzotriazole derivative (Tinuvin Carboprotect), 2-(benzotriazol-2-yl)-4,6-bis(2-methylbutan-2-yl)phenol (Tinuvin 328), 2-(Benzotriazol-2-yl)-6-[[3-(benzotriazol-2-yl)-2-hydroxy-5-(2,4,4-trimethylpentan-2-yl)phenyl]methyl]-4-(2,4,4-trimethylpentan-2-yl)phenol (Tinuvin 360), poly[[6-[(1,1,3,3-tetra-methylbutyl)amino]-1,3,5-triazine-2,4-diyl][(2,2,6,6-tetramethyl-4-piperidinyl)imino]-1, 6-hexanediyl[(2,2,6,6-tetramethyl-4-piperidinyl)imino]]) (Chimasorb 944 FD), 1-(4-methoxyphenyl)-3-(4-tert-butylphenyl)propane-1,3-dione (Parsol 1789) and mixtures thereof.

Component D

The polyamide molding composition according to the invention further comprises from 0 to 10% by weight of component D, based on the sum of components A to D.

According to a preferred embodiment of the present invention, the proportion of component D in the polyamide molding composition is in the range from 0 to 5.0% by weight, and particularly preferably 0.10 to 2.0% by weight, based in each case on the sum of components A to D.

A further preferred embodiment provides that the at least one additive D is selected from the group consisting of monomers, in particular lactams, plasticizers, impact modifiers, lubricants, mold release agents, condensation catalysts, chain regulators, in particular monofunctional carboxylic acids or amines, defoamers, antiblocking agents, natural layer silicates, synthetic layer silicates, nanoscale fillers and mixtures thereof.

Polyamide Molding Composition

A preferred embodiment of the present invention provides that the proportion of component A in the polyamide molding composition is in the range from 91 to 99.72 wt. % and particularly preferably in the range from 94.7 to 99.55 wt. %, and the proportion of component B in the polyamide molding composition is in the range from 0.08 to 1.5 wt.-% and particularly preferably 0.10 to 1.0% by weight, and the proportion of component C in the molding composition is in the range from 0.20 to 2.5% by weight and particularly preferably in the range from 0.25 to 2.3% by weight, and the proportion of component D in the molding composition is in the range from 0 to 5.0% by weight and particularly preferably in the range from 0.10 to 2.0% by weight, the proportions mentioned in each case being based on the sum of components A to D.

The polyamide molding compositions according to the invention are free from carbon black and/or nigrosine, i.e. they comprise neither carbon black nor nigrosine.

The molding compounds are colored black, i.e. the absorption in the visible range is high and thus the light transmission is low. The color lightness L* determined in the CIELAB color space according to DIN EN ISO 11664-4: 2020 on a plate of the dimension 60×60×2 mm is at most 32, preferably at most 30 and particularly preferably at most 27.

Preferably, the transmission in the wavelength range from 400 to 650 is at most 10%, particularly preferably at most 5% and especially preferably at most 3%. Furthermore, the transmission in the wavelength range from 750 to 1200 nm is preferably at least 50%, particularly preferably at least 60% and especially preferably at least 70%, and the transmission in the wavelength range from 400 to 650 nm is at most 10%, at most 5% and especially preferably at most 3%, determined in each case on a plate of the dimension 60×60×2 mm in accordance with DIN EN ISO 13468-2: 2006 by means of a UV/VIS/NIR spectrometer of the brand Cary 5000 from Agilent Technologies with integration sphere.

According to another preferred embodiment of the present invention, the gloss measured at a temperature of 23° C. at an angle of 60° on a molded article (sheet with the dimension 60×60×2 mm) made of the polyamide molding compound according to ISO 2813:2015 is at least 90%, preferably at least 95% and particularly preferably at least 100%.

According to another preferred embodiment of the present invention, the tensile modulus of elasticity of the polyamide molding composition determined according to ISO 527: 2012 is in the range from 1400 to 3000 MPa, preferably from 1500 to 2800 MPa and more preferably from 1600 to 2700 MPa.

According to another preferred embodiment of the present invention, the breaking stress of the polyamide molding composition determined according to ISO 527:2012 is from 40 to 120 MPa, preferably from 45 to 100 MPa and particularly preferably from 50 to 90 MPa.

According to another preferred embodiment of the present invention, the elongation at break of the polyamide molding composition determined according to ISO 527:2012 is greater than 20%, preferably greater than 40% and particularly preferably in the range of from 50 to 200%.

According to another preferred embodiment of the present invention, the impact strength of the polyamide molding composition determined according to ISO179/2:1997 is greater than 30 kJ/mm2, preferably greater than 50 kJ/mm2 and particularly preferably without fracture.

According to a further preferred embodiment of the present invention, the notched impact strength of the polyamide molding composition determined according to ISO 179/2:1997 is at least 6 kJ/mm2, preferably at least 7 kJ/mm2 and particularly preferably from 7 to 20 kJ/mm2.

A preferred polyamide molding composition according to the present invention consists of the following components:
  85 to 99.85% by weight of component A, where component A consists of polyamide A1 or a mixture consisting of 60 to 90% by weight polyamide A1 and 10 to 40% by weight % polyamide A2, where
    A1 is at least one amorphous or microcrystalline polyamide containing more than 60 mol % of monomers having exclusively aliphatic structural units, based on the total amount of monomers; and
    A2 is at least one acyclic aliphatic polyamide;
  where the sum of components A1 and A2 gives 100% by weight of component A;
  0.05 to 2.0% by weight of at least one colorant B;
  0.10 to 3.0% by weight of at least one stabilizer C;
  0 to 10% by weight of at least one additive D, different from A, B and C, the proportions by weight of components A to D add to 100 wt. %;
  the polyamide molding composition comprising neither carbon black nor nigrosine;
  the color lightness L*, determined according to DIN EN ISO 11664-4:2020 in the CIELAB color space, being at most 30, and the polyamides A1 having a transparency, determined according to ASTM D1003-21, of at least 90% and a haze of at most 3%. The color lightness and the transparency are determined on a plate of the dimension 60×60×2 mm.

Another preferred polyamide molding composition according to the present invention consists of the following components:
  85 to 99.85% by weight of component A, where component A consists of polyamide A1 or of a mixture of the polyamides A1 and A2 consisting of 60 to 90% by weight of polyamide A1 and 10 to 40% by weight of polyamide A2, where
    A1 is at least one amorphous or microcrystalline polyamide containing more than 60 mol % of monomers having exclusively aliphatic structural units, based on the total amount of monomers; and
    A2 is at least one acyclic aliphatic polyamide;
  wherein polyamide A1 is selected as 6I/6T/612/MACMI/MACMT/MACM12, MACM12, MACMI/12, PACMI/12, PACM12, MACM12/PACM12, and mixtures thereof;
  wherein polyamide A2 is selected from the group consisting of PA 11, PA 12, PA 1010, PA 1016, PA 610, PA 612, PA 614, PA 616, PA 66, PA 6, PA 6/12, and mixtures thereof; and mixtures thereof, is preferably selected as PA6/12 or PA12; and the sum of components A1 and A2 being 100% by weight of component A;
  0.05 to 2.0% by weight of at least one colorant B consisting of:
    B1 20-40% by weight of Solvent Green 3
    B2 10-30% by weight of Solvent Blue 97
    B3 40-70% by weight of Solvent Red 179
    where the sum of components B1 to B3 gives 100% by weight of component B;
  0.10 to 3.0% by weight of at least one stabilizer C;
  0 to 10% by weight of at least one additive D, different from A, B and C, the proportions by weight of components A to D adding up to 100% by weight; the polyamide molding composition comprising neither carbon black nor nigrosine;
  wherein the color lightness L*, determined according to DIN EN ISO 11664-4:2020 in the CIELAB color space, is at most 30, and wherein the polyamides A1 have a transparency of at least 90% and a haze of at most 3%, determined according to ASTM D1003-21. The color lightness and transparency are determined on a 60×60×2 mm sheet.

Molded Parts

The present invention further relates to molded parts or bodies comprising the molding composition as defined above, preferably the molded body consists of this polyamide molding composition. In particular, these molded articles are selected from the group consisting of interior and exterior parts for automobiles, motorcycles, camping vehicles or caravans, building and facade parts, decorative structural frames, operating knobs or levers, covers, visible surfaces, backlit components, screens of cell phones, tablets, housings of electronic devices, decorative parts in vehicles, household appliances, containers, vehicle keys, leisure and outdoor articles.

Use

Furthermore, the present invention relates to the use of a colorant or colorant mixture comprising neither carbon black nor nigrosine, having a high absorption in the wavelength range between 400 and 650 nm and a low absorption in the wavelength range between 750 and 1200 nm, for improving the weathering resistance of polyamide molding compounds based on transparent polyamides containing more than 60 mol % of monomers with aliphatic structural units, based on the total amount of monomers, which have a color lightness L*, determined according to DIN EN ISO 11664-4: 2020 in the CIELAB color space on a plate of the dimension 60×60×2 mm, of not more than 32.

The following examples will be used to explain the subject matter of the invention in more detail, without limiting it to the specific embodiments shown herein. In the context of this application, the following measurement methods were used:

Haze, Transparency

Transparency and haze were measured according to ASTM D1003-21 on a haze-gard Plus meter from BYK Gardner on 2 mm thick sheets (60 mm×60 mm surface area) with CIE illuminant C at 23° C.

Melting Point (Tm) and Enthalpy of Fusion (ΔHm).

The melting point and enthalpy of fusion were determined on granules according to DIN EN ISO 11357-3:2018. DSC (Differential Scanning Calorimetry) measurements were performed at a heating rate of 20 K/min.

Glass Transition Temperature, Tg

The glass transition temperature, Tg, was determined in accordance with DIN EN ISO 11357-2:2020 on granules using differential scanning calorimetry (DSC). This was carried out at a heating rate of 20 K/min for each of the heating processes. After the first heating, the sample was quenched in dry ice. Tg was determined during the second heating. The midpoint of the glass transition region, which was given as Tg, was determined by the "half height" method.

Relative Viscosity, $\eta_{rel}$

The relative viscosity was determined according to ISO 307 (2007) at 20° C. For this purpose, 0.5 g of polymer granules were weighed into 100 ml of m-cresol, and the relative viscosity (RV) was calculated according to RV=t/t0 following section 11 of the standard.

Tensile E-Modulus

Tensile Young's modulus and tensile strength were determined according to ISO 527 (2012) at 23° C. with a tensile speed of 1 mm/min on an ISO tensile bar (type A1, mass 170×20/10×4) prepared according to the standard: ISO/CD 3167 (2003).

Stress at Break and Elongation at Break

The determination of tensile stress at break and elongation at break were carried out according to ISO 527 (2012) at 23° C. with a tensile speed of 50 mm/min on an ISO tensile bar, type A1 (mass 170×20/10×4 mm), prepared according to the standard ISO/CD 3167 (2003).

Impact Strength According to Charpy

The determination of Charpy impact strength was carried out according to ISO 179/2*eU (1997, *2=instrumented) at 23° C. on an ISO test bar, type B1 (mass 80×10×4 mm), prepared according to the standard ISO/CD 3167 (2003).

Charpy Notched Impact Strength

The Charpy impact strength was determined according to ISO 179/2*eA (1997, *2=instrumented) at 23° C. on an ISO test bar, type B1 (mass 80×10×4 mm), prepared according to ISO/CD 3167 (2003).

Gloss 60°

Gloss was determined on plates of dimension 60×60×2 mm with a Minolta Multi Gloss 268 instrument at an angle of 60° and at a temperature of 23° C. according to ISO 2813 (2015). The gloss value is given in dimensionless gloss units (GU). Test specimens in the dry state were stored for 48 h after injection molding at room temperature in a dry environment, i.e. over silica gel.

Color Measurement

The CIE L*a*b* values of reference and test color plates were determined with a spectrophotometer from Datacolor (instrument designation: Datacolor 650) under the following measuring conditions according to DIN EN ISO 11664-4: 2020 in front of a white-coated contrast plate;

Measuring mode: reflection, measuring geometry: D/8°, illuminant: D 65 10, gloss: single-closed, calibration: UV-calibrated, measuring aperture: SAV. Using the L*, a*, and b* values of reference and sample according to the CIELAB system, the color lightness difference ΔL* is calculated as follows:

$$\Delta L^* = L^*_{specimen} - L^*_{reference}$$

The color distance ΔE between the color locations (L*a*b*)reference and (L*a*b*)specimen is calculated as Euclidean distance as follows:

$$\Delta E = \sqrt{(L^*_{specimen} - L^*_{reference})^2 + (a^*_{specimen} - a^*_{reference})^2 + (b^*_{specimen} - b^*_{reference})^2}$$

The color plates of dimension 2×40×50 mm used for the color measurement were injected from the different materials on an all-electric injection molding machine from Arburg (ARBURG Allrounder 320 A 500-170) with a tempered mold. In the weathering test, the reference for ΔL* or ΔE is the unconditioned or unweathered sample.

Weathering

Weathering was performed according to ISO 4892-2:2013 (Artificial weathering with xenon lamps, "Florida climate"), according to procedure A using a Weather-Ometer® Ci 4000. The radiation measured at 340 nm was 0.5 W/m2. The following cycle was run: 102 minutes dry, 18 minutes simulated rain, keeping the relative humidity at 65% during the "dry" phase. The black standard temperature (black panel) was 65° C.±3° C.

The materials used in the examples and comparisons are summarized in Table 1.

TABLE 1

Materials used for examples and comparative examples

| Component | Description | Manufacturer |
|---|---|---|
| Polyamide 1 Component A1 | PA 6I/6T/612/MACMI/MACMT/MACM12 (28/28/19/9/9/7) Relative viscosity = 1.73 Aliphatic units: 63 Mol-% transparency: 93%; haze: 0.6%; Tg: 140° C. | EMS-CHEMIE AG (Switzerland) |
| Polyamide 2 Component A1 | PA 6I/6T/612/MACMI/MACMT/MACM12 (20/20/24/11/11/14) rel. viscosity = 1.74 aliphatic units: 69 Mol-% Transparency: 93%; haze: 0.5%; Tg: 144° C. | EMS-CHEMIE AG (Switzerland) |
| Polyamide 3 Component A1 | PA MACM12 rel. viscosity = 1.85 aliphatic units: 100 Mol-%; transparency: 93%; haze: 0.3%; Tg: 153° C. | EMS-CHEMIE AG (Switzerland) |
| Polyamide 4 | 6I/6T/MACMI/MACMT/PACMI/PACMT/12 (39/39/7.1/7.1/2.2/2.5/2.8) rel. viscosity = 1.62 Aliphatic units: 51.4 Mol-% transparency: 93%; haze: 0.6%; Tg: 159° C. | EMS-CHEMIE AG (Switzerland) |
| PA 12 Component A2 | Polyamide 12 rel. viscosity = 1.85 | EMS-CHEMIE AG (Switzerland) |
| Colorant 1 Component B | Mixture of: 28.6 wt.-% Macrolex Green 5B (Solvent Green 3; 61565), 50.0 wt-% Macrolex Red E2G (Solvent Red 179; 564150) and 21.4 wt-% Macrolex Blue | Lanxess, DE |

TABLE 1-continued

Materials used for examples and comparative examples

| Component | Description | Manufacturer |
|---|---|---|
| Colorant 2 Component B | RR (Solvent Blue 97; 651290) Mixture of: 43.8 wt.-% Macrolex Grun 5B (Solvent Green 3; 61565), 35.4 wt.-% Macrolex Red E2G (Solvent Red 179; 564150) and 20.8 wt.-% Macrolex Red 5B (Solvent Red 52; 68210) | Lanxess, DE |
| Carbon black | Carbon Black FW1 | Orion Engineered Carbons, LU |
| Stabilisator Component C | Mixture of 45.25 wt.-% Tinuvin 1577 ED (CAS: 147315-50-2), 45.25 wt.-% Nylostab S-EED P (CAS: 42774-15-2), 4.75 wt.-% Irganox 1098 (CAS: 23128-74-7), 4.75 wt.-% Sandostab E-EPQ (CAS: 119345-01-6) | BASF, DE Clariant Int., CH BASF, DE Clariant Int., CH |
| Lubricant Component D | Calcium stearate (CAS: 1592-23-0) | Baerlocher, DE |

In general, the components are mixed (compounded) in the polymer melt on conventional compounding machines, such as single- or twin-screw extruders or screw kneaders, to produce the polyamide molding compound. The components are fed individually into the feeder or in the form of a dryblend or masterbatch. In the case of dryblend production, the dried polymer granules and the additives are mixed. To avoid moisture absorption, mixing can be carried out under dried inert gas. The dosages of all components are adjusted via electronically controlled scales so that the desired proportions of polymer and other components result.

Compounding takes place at set extruder barrel temperatures of, for example, 230 to 350° C., preferably 240 to 300° C. Vacuum can be applied upstream of the die or atmospheric degassing can be used. The melt can either be discharged in strand form into a water bath and then pelletized, or transferred directly into pellet form by hot knock-down under water. Preferably, underwater pelletizing or strand pelletizing is used for granulation.

The polyamide molding compound thus preferably obtained in granule form is then dried and can subsequently be further processed into moldings by injection molding. This is done by remelting the dry granules in a heatable cylinder, conveying the melt into an injection mold in which the melt can solidify.

Production of the polyamide molding compound according to examples B1 to B3 and VB1 to VB3.

The compounds for examples B1 to B3 and for the comparative examples VB1 to VB3 were produced on a twin-screw extruder from Werner & Pfleiderer, type ZSK 25. The polyamides A1 and A2 as well as the colorants and stabilizers were mixed together with the lubricant in the proportions indicated in Table 2 to form a dryblend. This dryblend was then metered into the feeder of the extruder.

The temperature of the first barrel (feed) was set to 80° C., and that of the remaining barrels in ascending order from 240 to 280° C. A speed of 200 rpm and a throughput of 15 kg/h were used and degassed in the third zone upstream of the die in a nitrogen stream. The polyamide molding compound discharged as a strand was cooled in a water bath at 80° C., granulated, and the resulting granules were dried at 90° C. in a vacuum at 30 mbar to a water content of less than 0.1 wt %.

Production of Test Specimens

Tensile bars, impact bars and plates were injected from the obtained granules as test specimens on which the properties given in Table 2 were determined. The test specimens were produced on an injection molding machine from Arburg, model Allrounder 420 C 1000-250. Ascending cylinder temperatures of 240° C. to 280° C. were used.

The mold temperature was 80° C. in the case of plates (2 mm×60 mm×60 mm) of examples B3 and VB2, all other plates were produced at 120° C. mold temperature. In the case of tension and impact bars, the die temperature was 80° C. in each case. Unless otherwise specified, the test specimens were used in a dry condition; for this purpose, they were stored for at least 48 h at room temperature in a dry environment, i.e., over silica gel, after injection molding. In the case of plates (2 mm×60 mm×60 mm) used to determine optical properties, the surfaces of the cavity of the injection mold were highly polished so that the molded bodies (plates) had a high gloss surface with a center arithmetic roughness Ra of 0.01 to 0.08 μm, and/or a roughness depth Rz of 0.05 to 1.0 μm, according to DIN EN ISO 4287:2010.

Results

TABLE 2

Examples and comparisons

| Component | Unit | B1 | B2 | B3 | VB1 | VB2 | VB3 |
|---|---|---|---|---|---|---|---|
| Polyamide 1 (Component A1) | wt.-% | 97.49 | | | | | |
| Polyamide 2 (Component A1) | wt.-% | | 97.49 | | 96.87 | | |
| Polyamide 3 (Component A1) | wt.-% | | | 68.24 | | 96.87 | |
| Polyamide 4 | wt.-% | | | | | | 97.49 |
| PA 12 (Component A2) | wt.-% | | | 29.25 | | | |

TABLE 2-continued

| | | Examples and comparisons | | | | | |
|---|---|---|---|---|---|---|---|
| Component | Unit | B1 | B2 | B3 | VB1 | VB2 | VB3 |
| Proportion A1 in A | wt.-% | 100 | 100 | 70 | 100 | 100 | 100 |
| Colorant 1 (Component B) | wt.-% | 0.21 | 0.21 | 0.21 | | | 0.21 |
| Colorant 2 (Component B) | wt.-% | | | | 0.48 | 0.48 | |
| Carbon black | wt.-% | | | | 0.35 | 0.35 | |
| Stabilizer (Component C) | wt.-% | 2.1 | 2.1 | 2.1 | 2.1 | 2.1 | 2.1 |
| Lubricant (Component D) | wt.-% | 0.20 | 0.20 | 0.20 | 0.20 | 0.20 | 0.20 |
| Properties | | | | | | | |
| Tensile modulus | MPa | 2350 | 2260 | 1600 | 2280 | 1560 | 2710 |
| Stress at break | MPa | 57 | 56 | 51 | 57 | 49 | 88 |
| Elongation at break | % | 80 | 105 | 130 | 70 | 97 | 4.3 |
| Impact strength | kJ/mm2 | No break | No break | No break | No break | No break | 50 |
| Notched impact strength | kJ/mm2 | 7.0 | 7.1 | 8.0 | 6.7 | 7.9 | 7.9 |
| Transmission 400-650 nm | % | <1 | <1 | <1 | <1 | <1 | <1 |
| Transmission 750-1200 nm | % | >75 | >75 | >75 | <1 | <1 | >75 |
| Gloss 60° | | 110 | 111 | 104 | 97 | 120 | 103 |
| Lightness L* | | 25.8 | 25.7 | 25.9 | 26.9 | 26.8 | 26.0 |
| Weathering ISO 4892-2: 2013 | | | | | | | |
| Gloss 60° after 1000 h | | 91 | 94 | 98 | 14 | 63 | 71 |
| Difference in lightness ΔL* after 1000 h | | 2.6 | 2.5 | 1.8 | 13.0 | 3.2 | 2.7 |
| Color distance ΔE after 1000 h | | 2.9 | 2.8 | 2.0 | 13.5 | 4.5 | 4.7 |

Table 2 shows that the black colored polyamide compounds according to examples B1 to B3 have an excellent gloss and a sufficient dark coloration. The comparative examples VB1 and VB2, additionally colored with carbon black, even show a slightly higher lightness. In contrast to the comparative examples, the gloss is largely retained after weathering in examples B1 to B3 according to the invention. In the case of VB1 to VB3, the gloss decreases by 31 to 85% after 1000 hours in the weathering test compared with the initial value. A comparison of examples B1 and B2 with the comparative example VB3 clearly shows that an excessively high concentration of aromatic structural units in the transparent polyamide VB3 leads to poorer weathering stability.

The invention claimed is:

1. A polyamide molding composition comprising the following components:
   85 to 99.85% by weight of a component A, where component A consists of polyamide A1 or of a mixture of the polyamides A1 and A2, where
   A1 is at least one amorphous or microcrystalline polyamide containing more than 60 mol-% of monomers having exclusively aliphatic structural units, based on the total amount of monomers; and
   A2 is at least one acyclic aliphatic polyamide; and
   the sum of components A1 and A2 being 100% by weight of component A;
   0.05 to 2.0% by weight of at least one colorant B;
   0.10 to 3.0% by weight of at least one stabilizer C;
   0 to 10% by weight of at least one additive D, other than A, B and C;
   the proportions by weight of components A to D add to 100% by weight; the polyamide molding composition comprising neither carbon black nor nigrosine;
   wherein the color lightness L*, determined according to DIN EN ISO 11664-4:2020 in the CIELAB color space on a plate of dimension 60×60×2 mm, is at most 32;
   and wherein the polyamides A1 have a transparency of at least 88% and a haze of at most 5%, in each case determined according to ASTM-D1003-21 on a plate of the dimension 60×60×2 mm.

2. The polyamide molding composition according to claim 1, wherein the transmission in the wavelength range from 750 to 1200 nm is at least 50%, and the transmission in the wavelength range from 400 to 650 nm is at most 10%, in each case determined with a UV/VIS/NIR spectrometer according to DIN EN ISO 13468-2:2006 on a plate of the dimension 60×60×2 mm.

3. Polyamide molding composition according to claim 1, wherein the at least one polyamide A1 is composed of the following monomers:
   a-A1 15 to 100 mol-% of cycloaliphatic diamines, based on the total amount of total amount of diamines;
   b-A1 0 to 85 mol % of open-chain aliphatic diamines, based on the total amount of diamines;
   c-A1 20 to 100 mol % of aliphatic dicarboxylic acids, based on the total amount of dicarboxylic acids;

d-A1 0 to 80 mol % of aromatic dicarboxylic acids, based on the total amount of dicarboxylic acids;

e-A1 0 to 40 mol % of aliphatic lactams and/or aliphatic amino carboxylic acids having 6 to 12 carbon atoms, based on the total amount of monomers a-A1 to e-A1;

where the sum of the diamines a-A1 and b-A1 is 100 mol % and where the sum of the dicarboxylic acids c-A1 and d-A1 is 100 mol %.

4. A polyamide molding composition according to claim 3, wherein the cycloaliphatic diamine a-A1 is selected from the group consisting of bis-(4-amino-3-methylcyclohexyl)methane, bis-(4-aminocyclohexyl)methane, bis-(4-amino-3,5-dimethylcyclohexyl)methane, 1,3-bis-(aminomethyl)cyclohexane, 1,4-bis-(aminomethyl)cyclohexane and mixtures thereof;

and/or the diamine b-A1 is selected from the group consisting of hexanediamine, 1,6-hexanediamine, 1,9-nonanediamine, 2-methyl-1,8-octanediamine, 1,10-decanediamine, 1,11-undecanediamine, 1,12-dodecanediamine, 1,13-tridecanediamine, 1,14-tetradecanediamine, 1,18-octadecanediamine, and mixtures thereof;

and/or the aliphatic dicarboxylic acid c-A1 is selected from the group consisting of 1,6-hexanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,16-hexadecanedioic acid, 1,18-octadecanedioic acid, and mixtures thereof;

and/or the aromatic dicarboxylic acid d-A1 is selected from the group consisting of terephthalic acid, isophthalic acid, 1,5-naphthalenedicarboxylic acid and 2,6-naphthalenedicarboxylic acid, and mixtures thereof;

and/or the lactam and/or the α,ω-aminocarboxylic acids e-A1 is selected from the group consisting of caprolactam (CL), α,ω-aminocaproic acid, α,ω-aminoundecanoic acid (AUA), lauric lactam (LL) and α,ω-aminododecanoic acid (ADA), and mixtures thereof.

5. Polyamide molding composition according to claim 1, wherein the at least one polyamide A1 contains at least 63 mol % of monomers having exclusively aliphatic structural units, based on the total amount of monomers.

6. A polyamide molding composition according to claim 1, wherein the at least one polyamide A2 is selected from the group consisting of PA 11, PA 12, PA 1010, PA 1016, PA 610, PA 612, PA 614, PA 616, PA 66, PA 6, and PA 6/12.

7. A polyamide molding composition according to claim 1, wherein component A consists of 50 to 95% by weight of polyamide A1 and 5 to 50% by weight of polyamide A2; or 60 to 85% by weight of polyamide A1 and 15 to 40% by weight of polyamide A2; or 65 to 80% by weight of polyamide A1 and 20 to 35% by weight of polyamide A2, the sum of components A1 and A2 being 100% by weight of component A.

8. The polyamide molding composition according to claim 1, wherein the polyamide A1 is selected from the group consisting of PA MACM9, PA MACM10, PA MACM11, PA MACM12, PA MACM13, PA MACM14, PA MACM15, PA MACM16, PA MACM17, PA MACM18, PA MACM36, PA PACM9, PA PACM10, PA PACM11, PA PACM12, PA PACM13, PA PACM14, PA PACM15, PA PACM16, PACM17, PA PACM18, PA PACM36, PA TMDC9, PA TMDC10, PA TMDC11, PA TMDC12, PA TMDC13, PA TMDC14, PA TMDC15, PA TMDC16, PA TMDC17, PA TMDC18, PA TMDC36, PA MACM10/1010, PA MACM10/PACM10, PA MACM12/1012, PA MACM14/1014, PA PACM10/1010, PA PACM12/1012, PA PACM14/1014, PA MACM12/PACM12, PA MACM14/PACM14, PA MACMI/12, PA MACMI/1012, PA MACMT/12, PA MACMI/MACMT/12, PA MACMI/MACMT/MACM12, PA 6I/6T/MACMI/MACMT/12, PA 6I/612/MACMI/MACM12, PA 6T/612/MACMT/MACM12, PA 6I/6T/612/MACMI/MACMT/MACM12, PA 6I/6T/MACMI/MACMT/PACMI/PACMT/12, PA MACMI/MACMT/MACM36, PA MACMI/MACM36, PAMACMT/MACM36, PA PACMI/12, PA PACMT/12, PA PACMT/6, PA PACMI/6, and blends thereof.

9. Polyamide moulding composition according to claim 1, wherein the colorant B is selected from the group consisting of pyrazolone, perinone, anthraquinone, methine, azo and coumarin dyes, metal-containing pigments, inorganic pigments, the metal complexes of azo, azomethine or methine dyes, azomethine, quinacridone, dioxazine, isoindoline, isoindolinone, perylene, phthalocyanine, pyrrolopyrrole and thioindigo colorants.

10. Polyamide molding composition according to claim 1, wherein the at least one colorant B is selected from the group consisting of Solvent Green 3, Solvent Green 28, Solvent Red 52, Solvent Red 111, Solvent Red 135, Solvent Red 169, Solvent Red 179, Solvent Red 207, Disperse Red 22, Vat Red 41, Solvent Orange 60, Solvent Orange 63, Solvent Violet 13, Solvent Violet 14, Solvent Violet 50, Disperse Blue 73, Solvent Blue 97, Solvent Blue 101, Solvent Blue 104, Solvent Blue 138, Disperse Yellow 160, Solvent Yellow 84, Solvent Yellow 93, Solvent Yellow 98, Solvent Yellow 163, and Solvent Yellow 160:1.

11. Polyamide molding composition according to claim 1, wherein the at least one colorant B is selected as a dye mixture of Solvent Green 3 and Solvent Red 179; or Solvent Red 52 and Solvent Blue 97; or Solvent Green 3, Solvent Blue 97 and Solvent Red 179; or as a dye mixture B consisting of the components B1 20-40% by weight Solvent Green 3;

B2 10-30% by weight of Solvent Blue 97; and

B3 40-70% by weight of Solvent Red 179;

where the sum of B1 to B3 is 100% by weight of colorant B.

12. Polyamide molding composition according to claim 1, wherein the at least one stabilizer C is selected from the group consisting of inorganic and organic stabilizers, antioxidants, antiozonants, heat stabilizers, light stabilizers, UV stabilizers, UV absorbers or UV blockers.

13. Polyamide molding composition according to claim 1, wherein the at least one additive D is selected from the group consisting of plasticizers, impact modifiers, lubricants, mold release agents, condensation catalysts, chain regulators, monofunctional carboxylic acids or amines, defoamers, antiblocking agents, natural layer silicates, synthetic layer silicates, and nanoscale fillers.

14. Molded article comprising a polyamide molding composition according to claim 1.

15. A molded article according to claim 14, selected from the group consisting of interior and exterior parts for automobiles, motorcycles, camping vehicles or caravans, building and facade parts, decorative structural frames, operating knobs or levers, covers, visible surfaces, backlit components, screens of cell phones, tablets, housings of electronic devices, decorative parts in vehicles, household appliances, containers, vehicle keys, leisure and outdoor articles.

16. The polyamide molding composition according to claim 1, wherein the transmission in the wavelength range from 750 to 1200 nm is at least 60%, and the transmission in the wavelength range from 400 to 650 nm is at most 5%, in each case determined with a UV/VIS/NIR spectrometer according to DIN EN ISO 13468-2:2006 on a plate of the dimension 60×60×2 mm.

17. The polyamide molding composition according to claim 1, wherein the transmission in the wavelength range from 750 to 1200 nm is at least 70%, and the transmission in the wavelength range from 400 to 650 nm is at most 3%, in each case determined with a UV/VIS/NIR spectrometer according to DIN EN ISO 13468-2:2006 on a plate of the dimension 60×60×2 mm.

18. The polyamide molding composition according to claim 1, wherein the at least one polyamide A1 contains in the range from 63 to 100 mol % of monomers having exclusively aliphatic structural units, based on the total amount of monomers.

19. The polyamide molding composition according to claim 1, wherein the at least one stabilizer C is selected from the group consisting of antioxidants, antiozonants, heat stabilizers, light stabilizers, UV stabilizers, UV absorbers or UV blockers.

* * * * *